J. A. WINTON & G. C. REED.
LOCK NUT.
APPLICATION FILED OCT. 31, 1917.
1,271,643.
Patented July 9, 1918.
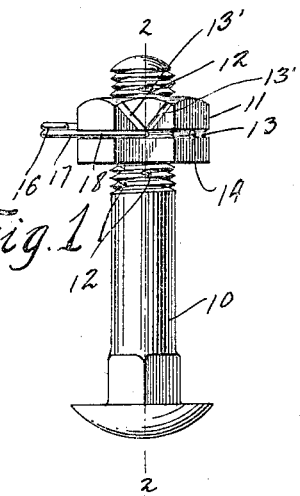
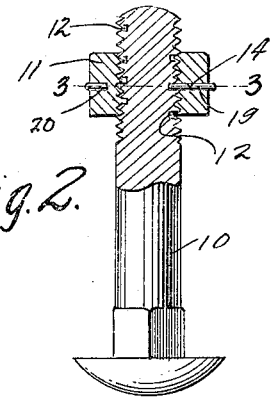
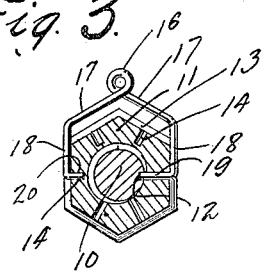
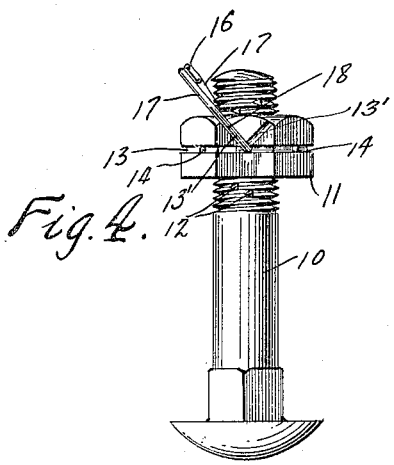
Witnesses
Inventor
J. A. Winton and G. C. Reed
By
Attorney

UNITED STATES PATENT OFFICE.

JAMES A. WINTON AND GEORGE C. REED, OF SEASIDE, OREGON.

LOCK-NUT.

1,271,643.   Specification of Letters Patent.   Patented July 9, 1918.

Application filed October 31, 1917. Serial No. 199,541.

*To all whom it may concern:*

Be it known that we, JAMES A. WINTON and GEORGE C. REED, citizens of the United States, residing at Seaside, in the county of Clatsop, State of Oregon, have invented certain new and useful Improvements in Lock-Nuts; and we do hereby declare the following to be a full, clear, and exact description of the invention, such as will enable others skilled in the art to which it appertains to make and use the same.

This invention relates to new and useful improvements in nut locks.

One object of the present invention is to provide a novel and simple device whereby the nut can be effectively locked against rotation on the bolt in a retrograde direction.

Another object is to provide a locking means for the nut which can be quickly and easily applied and removed and which will not become accidentally displaced.

A further object is to provide a nut which is so constructed that the locking member can be swung into different positions thereon, while in locking position, to avoid contact with surrounding parts of a machine, especially when the nut is disposed close to a part of the frame of the machine.

Other objects and advantages will be apparent from the following description when taken in connection with the accompanying drawing.

In the drawing:

Figure 1 is an elevation of a nut and bolt equipped with our improved locking means.

Fig. 2 is a horizontal sectional view taken on the line 2—2 of Fig. 1.

Fig. 3 is a transverse sectional view taken on the line 3—3 of Fig. 2.

Fig. 4 is an elevation of the device showing the locking means in position to avoid contacting with adjacent parts of a machine.

Referring particularly to the accompanying drawing, 10 represents a bolt and 11 a nut engaged thereon. In the groove of the thread of the bolt there are formed the recesses or depressions 12, the purpose of which will appear later herein, the recesses being arranged at spaced distances through the length of the said groove, as clearly shown in the drawing.

Formed circumferentially in the peripheral face of the nut is a continuous groove 13, and in each of the faces of the nut, in the bottom of the groove 13, there is formed an opening 14 the same extending through the nut and into the central threaded bore thereof. In each of two opposite faces of the nut, there are formed the pair of grooves 13′, said grooves beginning at the opening 14 and diverging toward the other end face of the nut. These openings 14 are adapted to register, successively, with the recesses in the bolt to receive a portion of the locking device which will now be described.

The locking is preferably formed from stiff spring wire and includes a central coil portion 16 from which extends the pair of oppositely directed and divergent arms 17. The outer ends of the arms are directed in parallel relation to each other, as at 18, and then turned inwardly toward each other, as at 19, and 20, respectively. It will be noted that the end 19 is considerably longer than the end 20 whereby when said end is inserted in one of the openings 14 of the nut it will pass therethrough and into one of the recesses in the bolt, as clearly seen in the sectional view Fig. 2. The other or shorter end is arranged to enter the opening 14 in the diametrically opposite face of the nut, the arms thus partially encircling the nut and lying in the circumferential groove 13. The resiliency of the locking device holds the parts in the position just described.

Should it happen that the nut is so disposed that the locking device could not be disposed in the circumferential groove 13, the said locking device is swung into the position shown in Fig. 4, wherein the parallel portions of the arms thereof are disposed in the inclined grooves.

To permit the nut to be turned on or off the bolt, the arm which has the longer end is raised by the insertion of a pointed tool between the arm and the face of the nut, the said longer end being permitted to bear against the face of the nut while the nut is turned. When the nut has been turned the required distance the locking device is pushed until the longer snaps through the opening 14 and into one of the recesses 12 in the bolt. Thus the nut is firmly held against backward movement on the bolt, while permitting the same to be turned forwardly.

What is claimed is:

A nut lock including a bolt having a plurality of recesses in the groove of the threaded portion thereof, a nut engaged on the bolt and having a circumferentially arranged groove, each face of the nut having an opening in the bottom of the groove and extending into the central bore of the nut, each face of the nut having a pair of outwardly diverging grooves the meeting ends of which are disposed at the said last-named opening in the side of the nut; and a spring yoke having a central coil portion and arms provided respectively with a shorter inwardly directed end for engagement in one of the side openings of the nut and a longer end for engagement in an opposite opening and into one of the recesses in the bolt, the arms of the yoke being adapted to lie at times in the divergent grooves.

In testimony whereof, we affix our signatures in the presence of two witnesses.

JAMES A. WINTON.
GEORGE C. REED.

Witnesses:
PHILLIP BECK,
TENNIS MATHISEN.

Copies of this patent may be obtained for five cents each, by addressing the "Commissioner of Patents, Washington, D. C."